US007617502B2

(12) United States Patent
Sprague

(10) Patent No.: US 7,617,502 B2
(45) Date of Patent: Nov. 10, 2009

(54) MANAGING PERIPHERAL DEVICE DRIVERS

(75) Inventor: Jeffrey R. Sprague, San Jose, CA (US)

(73) Assignee: Scientific-Atlanta, LLC, Lawrenceville, GA (US)

( * ) Notice: Subject to any disclaimer, the term of this patent is extended or adjusted under 35 U.S.C. 154(b) by 1433 days.

(21) Appl. No.: 10/288,942

(22) Filed: Nov. 6, 2002

(65) Prior Publication Data
US 2004/0088718 A1 May 6, 2004

(51) Int. Cl.
*G06F 9/44* (2006.01)
*G06F 9/455* (2006.01)
(52) U.S. Cl. ............... 719/322; 717/173; 717/178
(58) Field of Classification Search .......... 719/310, 719/322, 318, 328, 321; 717/173–178; 707/104.1; 340/500; 400/62; 709/227; 725/100, 110, 725/131, 139, 157, 151, 152; 718/100
See application file for complete search history.

(56) References Cited

U.S. PATENT DOCUMENTS

| | | | | |
|---|---|---|---|---|
| 5,809,250 | A * | 9/1998 | Kisor | 709/227 |
| 6,023,585 | A * | 2/2000 | Perlman et al. | 717/178 |
| 6,393,496 | B1 * | 5/2002 | Schwaderer et al. | 719/328 |
| 6,607,314 | B1 * | 8/2003 | McCannon et al. | 400/62 |
| 6,714,946 | B1 * | 3/2004 | Kanai et al. | 707/104.1 |
| 6,933,840 | B2 * | 8/2005 | Cariffe | 340/500 |
| 2002/0065950 | A1 * | 5/2002 | Katz et al. | 709/318 |
| 2002/0083228 | A1 * | 6/2002 | Chiloyan et al. | 710/9 |
| 2002/0095501 | A1 * | 7/2002 | Chiloyan et al. | 709/227 |
| 2003/0069915 | A1 * | 4/2003 | Clough et al. | 718/100 |
| 2004/0088180 | A1 * | 5/2004 | Akins, III | 705/1 |

OTHER PUBLICATIONS

Milenkovic "Delivering Interactive Services via a Digital TV Infrastructure" 1998 IEEE, pp. 34-43.*
Easwar et al. "Multimedia System on a Chip for Set-top Box Applications" 1999 IEEE, pp. 356-357.*
Jaeger et al. "Set-top Box Software Architectures for Digital Video Broadcast and Interactive services" 2001 IEEE, pp. 287-292.*
Kamperman et al. "Conditional Access System Interoperability Through Software Downloading" 2001 IEEE, pp. 47-54.*
"Technology Breakout 2: Print Manager," by Paul Wegner, Power Summit 2001, PowerTV, Inc. Annual Conference, San Francisco, CA, Sep. 5, 2001, pp. 1-15.

* cited by examiner

*Primary Examiner*—Van H Nguyen
(74) *Attorney, Agent, or Firm*—Merchant & Gould

(57) ABSTRACT

Systems and methods are provided for processing device drivers, or software drivers, which enable a device, such as a peripheral device, to perform a particular task. One such method, among others, includes receiving a request for a task to be performed by a peripheral device. In response to receiving the request, the method further includes downloading a peripheral device driver that is configured to enable the peripheral device to perform the requested task.

20 Claims, 7 Drawing Sheets

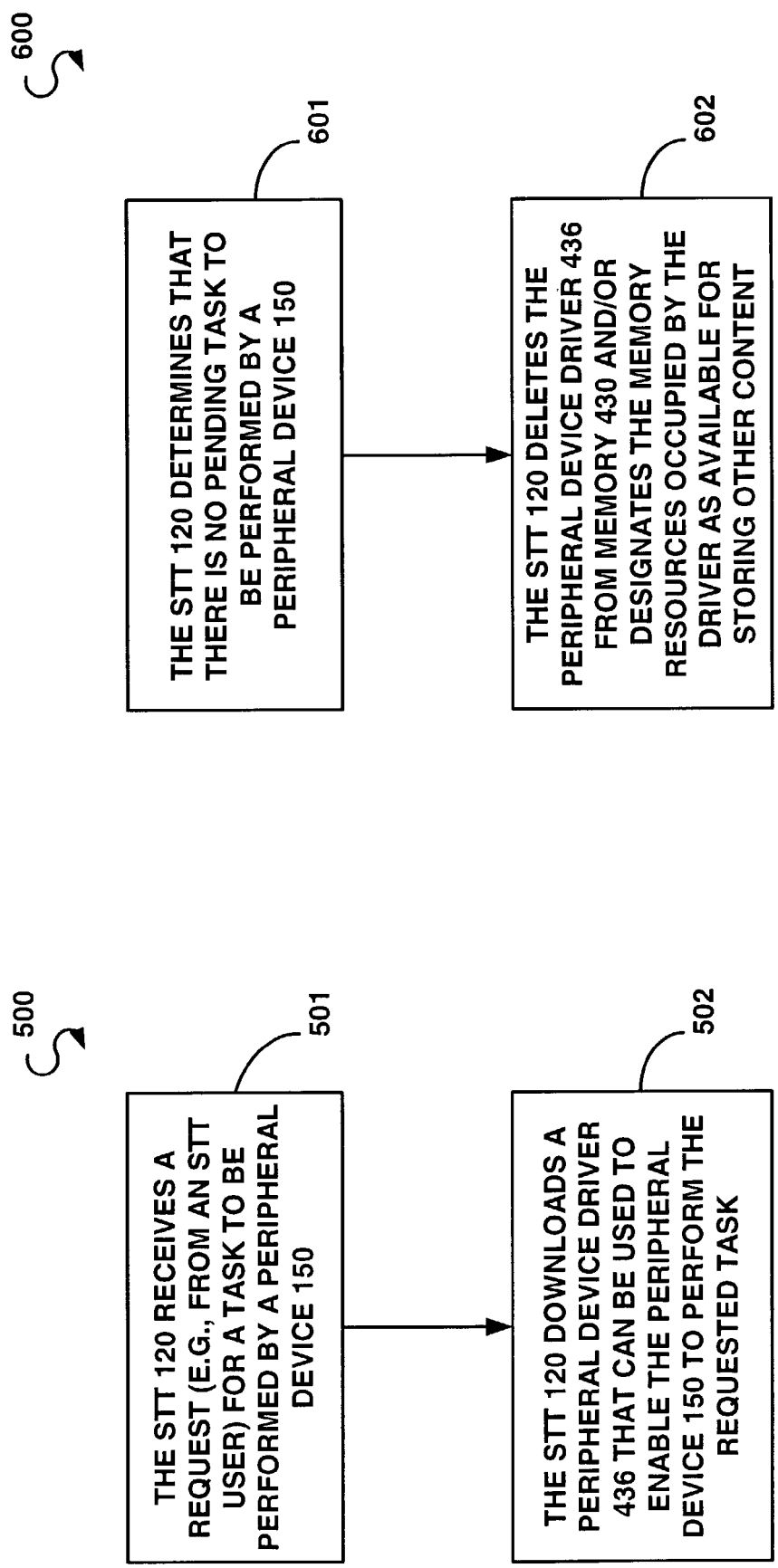

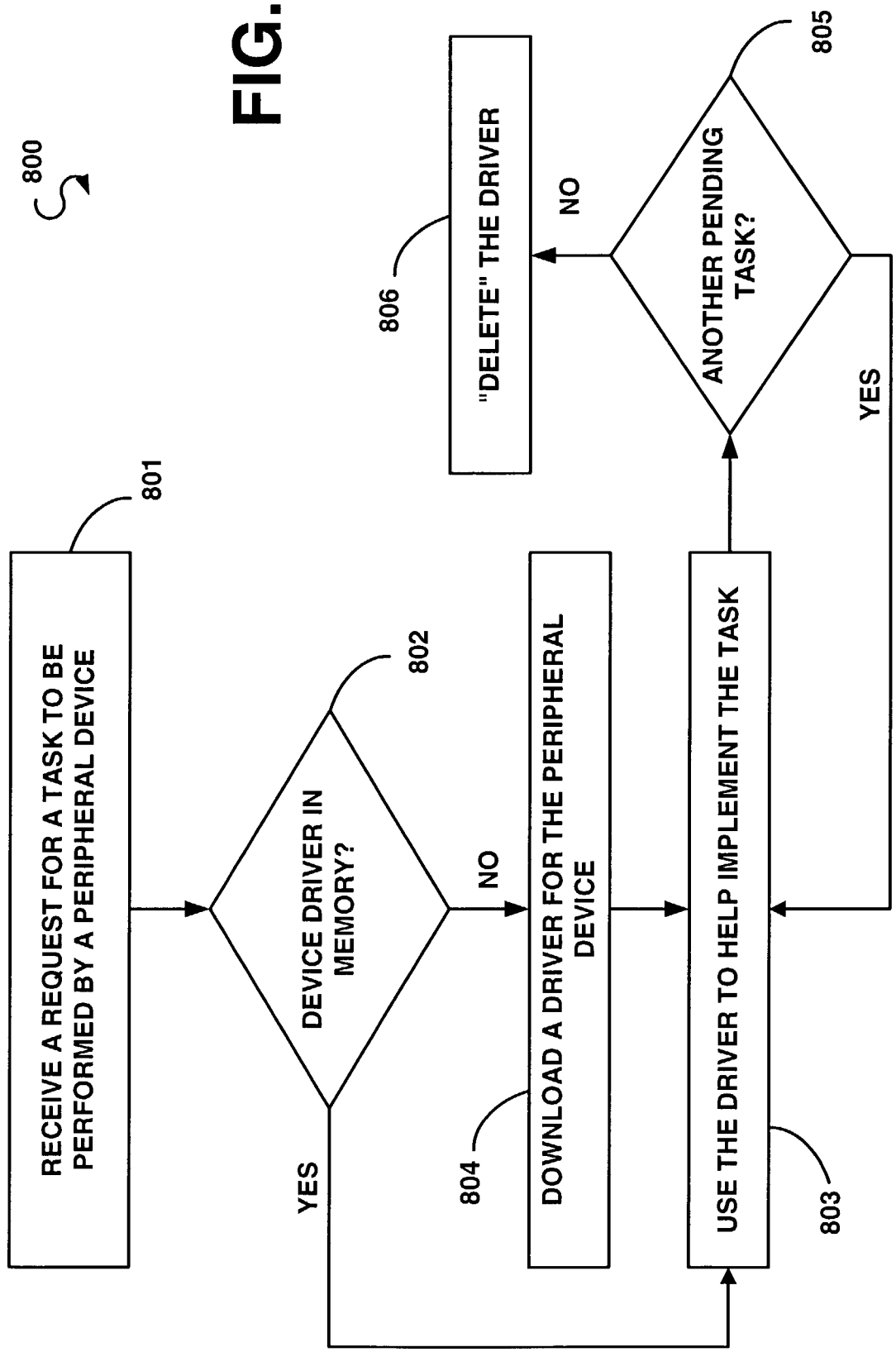

MANAGING PERIPHERAL DEVICE DRIVERS

TECHNICAL FIELD

The present invention is generally related to subscriber television systems, and, more particularly, is related to managing peripheral device drivers in a television set-top terminal.

BACKGROUND OF THE INVENTION

Cable television systems are now capable of providing many services in addition to analog broadcast video. In implementing enhanced programming, the set-top terminal (STT), otherwise known as the set-top box, has become an important computing device for accessing various video services. In addition to supporting traditional analog broadcast video functionality, many STTs now also provide other functionality, such as, for example, an interactive program guide, video-on-demand, and video recording and playback.

An STT is typically connected to a communications network (e.g., a cable or satellite television network) and includes hardware and software necessary to provide various services and functionality. Preferably, some of the software executed by an STT is downloaded and/or updated via the communications network. Each STT also typically includes a processor, communication components, and memory, and is connected to a television or other display device. While many conventional STTs are stand-alone devices that are externally connected to a television, an STT and/or its functionality may be integrated into a television or other device, as will be appreciated by those of ordinary skill in the art.

An STT may include a communication port (e.g., a universal serial bus (USB)) for allowing the STT to be connected to one or more types of peripheral devices, such as, for example, portable audio players, printers, or digital cameras, among others. However, in order for an STT to be capable of communicating with many types and models of peripheral devices, the STT may need to have a large number of suitable device drivers stored in the STT's memory. This may require a large amount of memory and may reduce the amount of memory available for other functionality. Alternatively, an STT may be configured to include additional memory resources for accommodating the large number of device drivers. However, such an STT may not be cost effective and may not be able to communicate with newer peripheral devices for which no device driver is stored in the STT's memory. Yet another alternative is to store a limited number of device drivers in the STT. This approach, however, may prevent STT users from using many types and models of peripheral devices in connection with their STTs. Therefore, there exists a need for addressing these and/or other problems associated with operating peripheral devices.

BRIEF DESCRIPTION OF THE DRAWINGS

The preferred embodiments of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 5 is a flow chart depicting a method for downloading a peripheral device driver (PDD) according to one embodiment of the invention.

FIG. 6 is a flow chart depicting a method for deleting a PDD according to one embodiment of the invention.

FIG. 8 is a flow chart depicting a method for managing a PDD according to one embodiment of the invention.

DETAILED DESCRIPTION OF THE PREFERRED EMBODIMENTS

Preferred embodiments of the invention can be understood in the context of a subscriber television system comprising a set-top terminal (STT). In one embodiment of the invention, an STT receives a request (e.g., from an STT user) for a task to be performed by a peripheral device that is coupled to the STT. Then, in response to receiving the request, the STT downloads a software driver that can be used to enable the peripheral device to perform the requested task. This and other embodiments are explained in more detail below.

Figure 1:
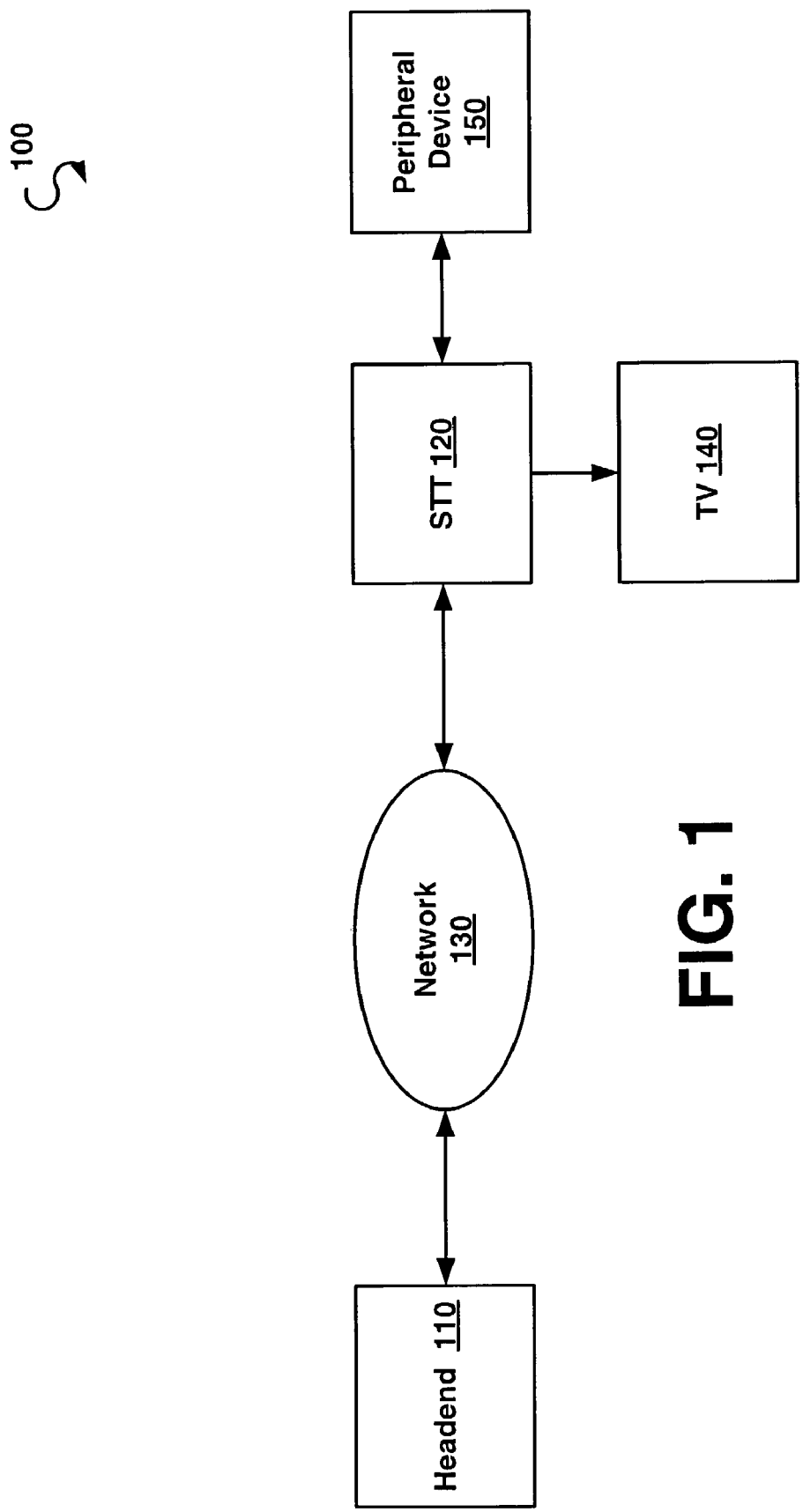
FIG. 1 is a block diagram depicting a non-limiting example of a subscriber television system.
Figure 2:
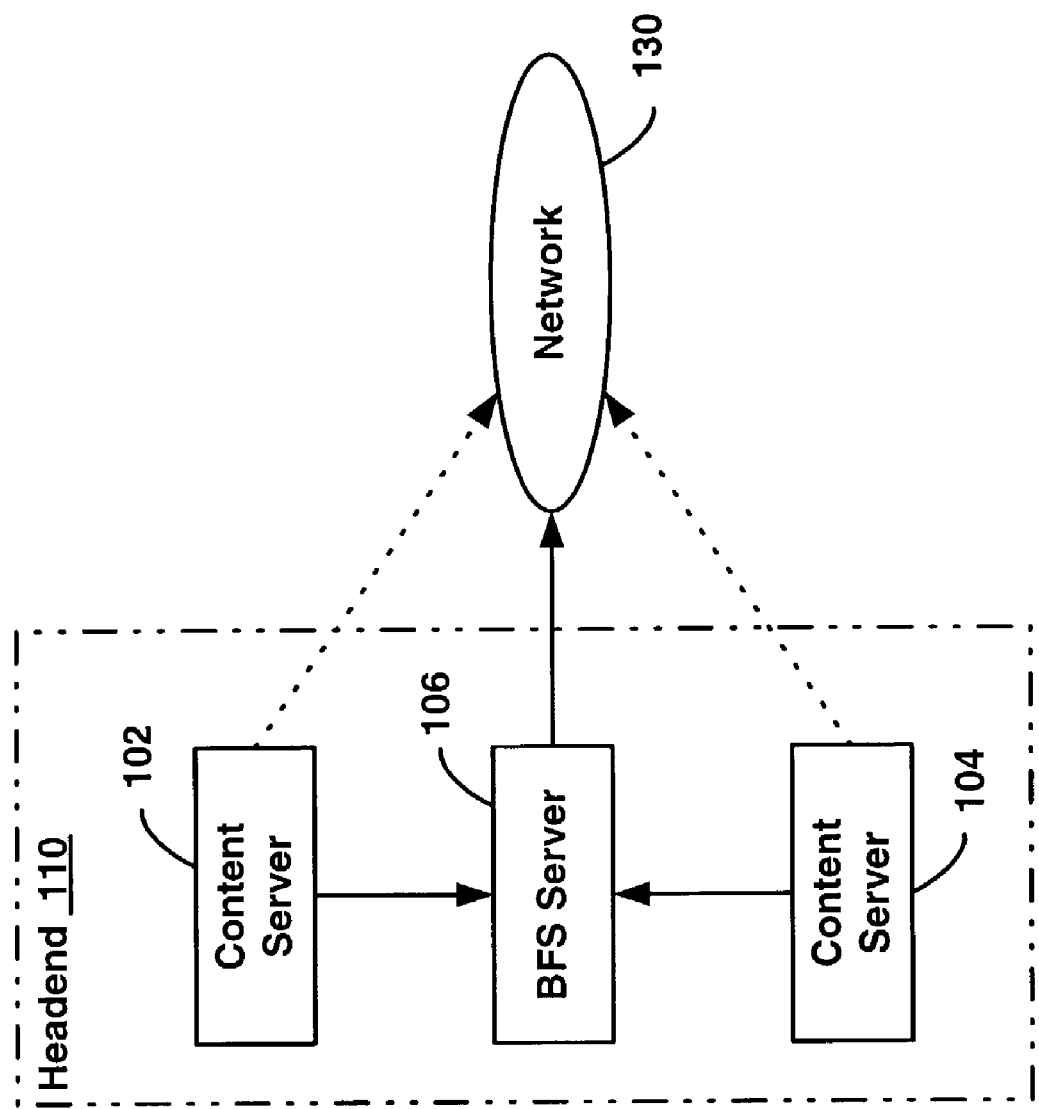
FIG. 2 is a block diagram depicting a non-limiting example of selected components of a headend, according to one embodiment of the present invention.
Figure 3:
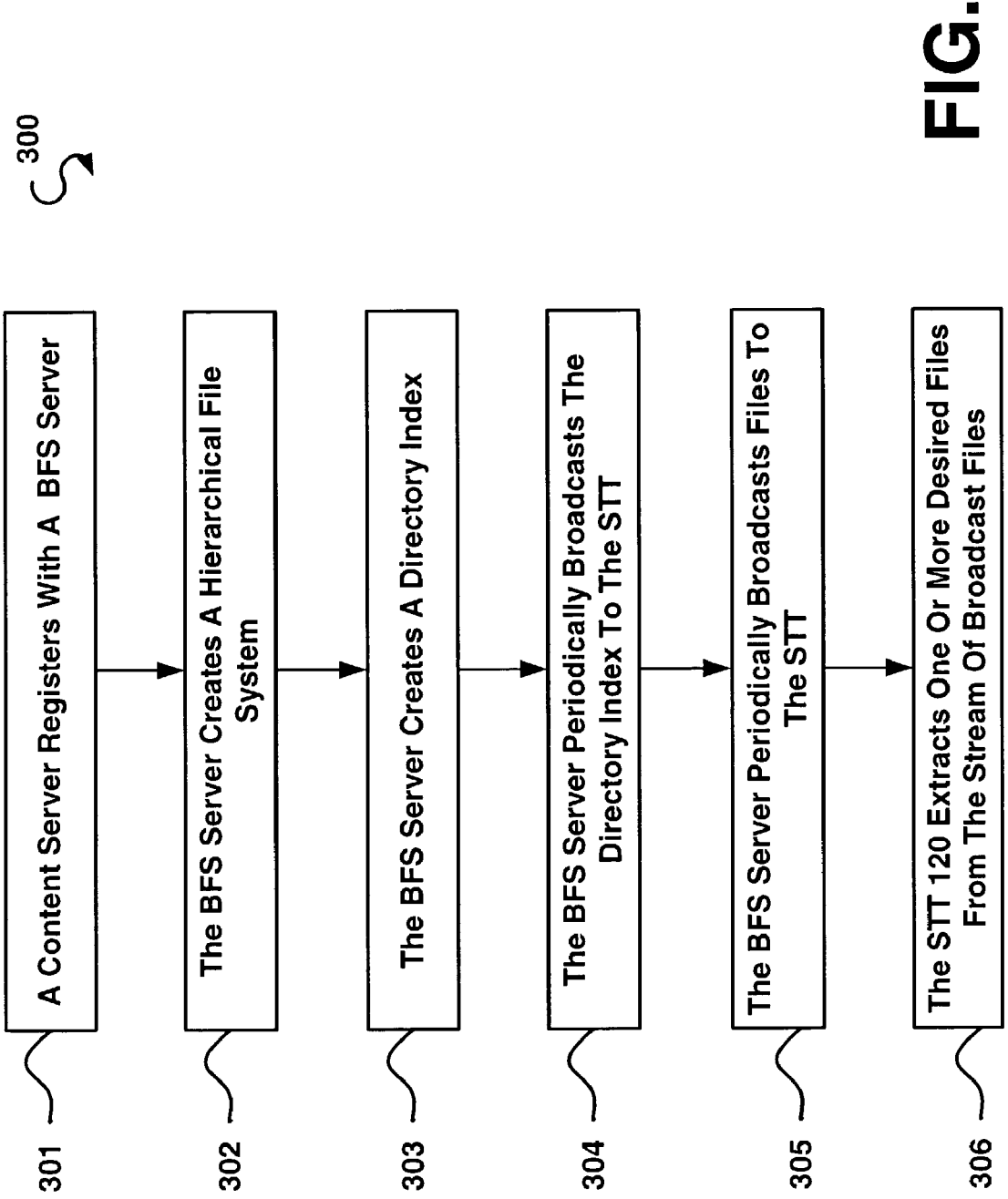
FIG. 3 is a flow chart illustrating a data carousel method in accordance with one possible embodiment of the invention.
Figure 4:
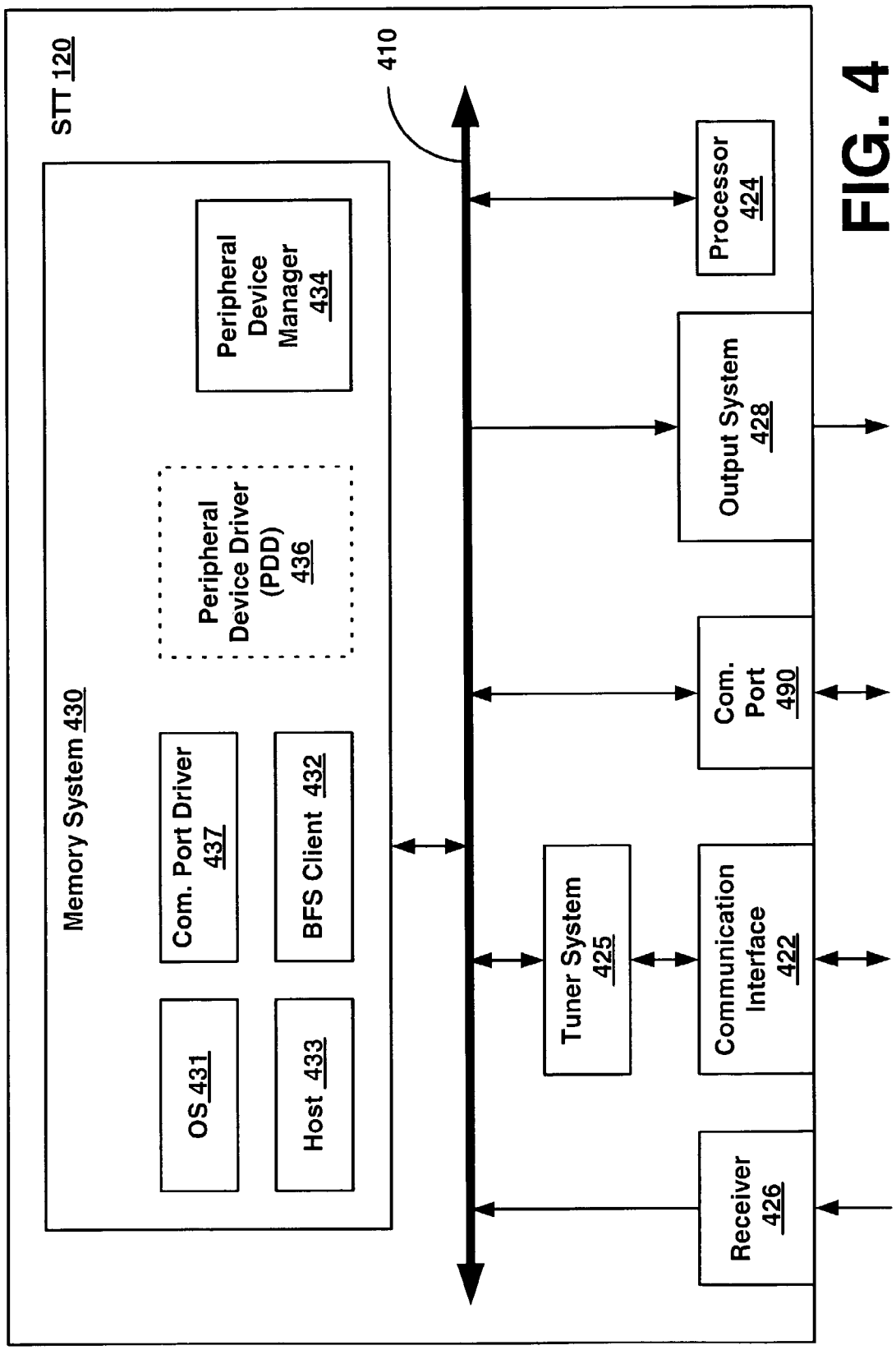
FIG. 4 is a block diagram depicting a non-limiting example of a set-top terminal in accordance with one embodiment of the invention.

In the description that follows, FIGS. 1, 2, and 4 will provide examples of components that may be used to implement a peripheral device driver (PDD) management system. Furthermore, examples of methods related to managing a PDD are illustrated in the flow charts of FIGS. 3 and 5-8. Note, however, that the invention may be embodied in many different forms and should not be construed as limited to the embodiments set forth herein. Furthermore, all examples given herein are intended to be non-limiting, and are provided in order to help clarify the invention.

Reference is now made to FIG. 1, which is a block diagram depicting a non-limiting example of a subscriber television system (STS) 100. In this example, the STS 100 includes a headend 110 and an STT 120 (representative of a plurality of STTs 120) that are coupled to a communications network 130. The STT 120 is typically situated at a customer's premises, and may be a stand-alone unit or integrated into another device such as, for example, a television 140. The customer's premises may be a user's residence or place of business, for example. The STT 120 receives signals (video, audio and/or other data) from the headend 110 through the network 130 and provides upstream information to the headend 110 through the network 130. The network 130 may be any suitable means for propagating signals between the headend 110 and the STT 120, for example, a hybrid fiber coax (HFC) network, the Internet, or a satellite communications network, among others.

The STT 120 is communicatively coupled to a peripheral device 150 via a wired or wireless communication system. The peripheral device 150 may be, for example, but not limited to, a printer, a scanner, or a memory device, etc. The STT 120 is configured to download from the headend 110 (or some other location) a PDD for driving the peripheral device 150. In one embodiment, a plurality of peripheral devices 150 may be coupled to the STT 120.

FIG. 2 is a block diagram depicting a non-limiting example of selected components of a headend 110, according to one embodiment of the present invention. The headend 110 comprises a plurality of servers including a first content server 102 and a second content server 104 coupled to a BFS server 106. Each content server may, in one embodiment, be dedicated to providing certain types of data or software. For example, a content server may be dedicated to providing peripheral device drivers to STTs 120 (FIG. 1). The BFS server 106 and/or the content servers 104 and 106 are coupled to the communications network 130.

The BFS server 106 periodically broadcasts files over the communications network 130. Such periodic broadcasts are preferably made unilaterally, i.e., not in response to requests for the files. In one embodiment, the STT 120 receives from the BFS server 106 one or more files comprising a software driver for operating the peripheral device 150. Of course, other embodiments include two-way communication systems and methods in which a driver is provided to the STT 120 in response to a request for the driver by the STT 120.

The repetitive broadcasts by the BFS server 106 may be achieved using, for example, a broadcast carousel mechanism that is defined in the Digital Storage Media Command and Control (DSM-CC) specification ISC/IEC 13818-6 IS, which is hereby incorporated by reference in its entirety. The DSM-CC standard was developed for the delivery of multimedia services and includes several protocol areas addressing different application needs. In one possible implementation, the BFS server 106 uses a DSM-CC User-to-User Object Carousel protocol to broadcast files to the STT 120.

FIG. 3 is a flow chart illustrating a data carousel method 300 in accordance with one possible embodiment of the invention, among others. When a content server wishes to broadcast a file (e.g., comprising data and/or software) via the communications network 130, the content server initially registers (block 301) with the BFS server 106. The BFS server 106 then creates a hierarchical file system (block 302) with all respective files available from each content server that is registered with the BFS server 106.

The BFS server 106 may start with a home directory such as, for example, "\BFS\", and each content server that has registered with the BFS server 106 may be assigned a respective directory in this hierarchical file system. For example, if the first content server 102 and the second content server 104 register with the BFS server 106, then, a first directory "\BFS\first content server\" under the home directory "\BFS\" may be created for the first content server 102, and a second directory "BFSsecond content server" under the home directory "\BFS\" may be created for the second content server 104.

The first content server 102 and the second content server 104 may also create subdirectories under their respective directories. For example, the first content server may create a subdirectory "\BFS\first content server\first subdirectory\." Additionally, a content server may create and maintain a file under the respective directory for that server. For example, the first content server 102 may create a file under its respective directory (e.g., "\BFS\first content server\first file") or under a subdirectory (e.g., "\BFS\first content server\first subdirectory\first file").

The BFS server 106 creates a directory index (block 303) of all files available from the plurality of servers wishing to broadcast such files to the STT 120 via the communications network 130. This directory index is periodically broadcast (block 304) to the STT 120 via the communications network 130 by the BFS server 106 to inform the STT 120 of files that are available from the plurality of servers. A directory index may include channel information indicating which channel will be used to broadcast a particular file. Each content server may add files to be broadcast to the STT 120 under a respective directory assigned to that server by the BFS server 106.

The directory index is updated as new servers register with the BFS server 106, as old servers unregister with the BFS server 106, and as each content server modifies the contents under its respective directory. For example, when a content server no longer wishes to broadcast any files via the communications network 130, that server may unregister with the BFS server 106 to remove the respective directory for that server from the directory index. In addition to creating and modifying subdirectories and files under a respective directory assigned by the BFS server 106, the content servers 102 and 104 may delete subdirectories and files.

The BFS server 106 and/or the content servers 102 and 104 periodically broadcast (block 305) files to the STT 120. The BFS server 106 may broadcast files using any of a number of possible broadcasting schemes. As a non-limiting example, among others, one scheme may involve broadcasting certain files more frequently than other files. The STT 120 extracts one or more desired files from among files broadcast by the BFS server and/or by the content servers 102 and 104 (block 306).

FIG. 4 is a block diagram depicting a non-limiting example of an STT 120 in accordance with one embodiment of the invention. The STT 120 includes a communications interface 422 for receiving signals (video, audio and/or other data) from the headend 10, at least one processor 424 for controlling operations of the STT 120, an output system 428 for driving the television 140 (FIG. 1), and a tuner system 425 for tuning to a particular television service to be displayed. The tuner system 425 may include, in one implementation, an out-of-band tuner for bidirectional quadrature phase shift keying (QPSK) data communication and a quadrature amplitude modulation (QAM) tuner (in-band) for receiving television signals. Files that are broadcast by the BFS server 106 and/or the content servers 102 & 104 are preferably received by the out-of-band tuner. In another embodiment, however, files may be received by the in-band tuner and/or by the out-of-band tuner, depending on a desired implementation. A receiver 426 receives externally-generated user inputs or commands from an input device such as, for example, a remote control device.

A communication port 490 is used to communicate with a peripheral device 150 (FIG. 1). The communication port 490 may comprise, for example, a USB (Universal Serial Bus), an Ethernet port (for connection to a computer), an IEEE-1394 connection, a serial port, a parallel port, a wireless radio frequency (RF) interface, and/or an infra-red (IR) interface, among others.

The processor 424, memory system 430, output system 428, communication port 490, receiver 426, and tuner system 425 are coupled to a local interface 410. The local interface 410 can be, for example but not limited to, one or more buses or other wired or wireless connections. The local interface 410 may have additional elements to enable communications, such as controllers, buffers (caches), drivers, repeaters, and/or receivers, which are omitted for simplicity.

The processor 424 is a hardware device for executing software, particularly that stored in memory system 430. The processor 424 can be any custom made or commercially available processor, a central processing unit (CPU), an auxiliary processor among several processors associated with the STT 120, a semiconductor based microprocessor (in the form of a microchip or chip set), or generally any device for executing software instructions. When the STT 120 is in operation, the processor 424 is configured to execute software stored within the memory system 430, to communicate data to and from the memory system 430, and to generally control operations of the STT 120 pursuant to the software.

The memory system 430 can include any one or combination of volatile memory elements (e.g., random access memory (RAM), dynamic RAM (DRAM), static RAM (SRAM), synchronous DRAM (SDRAM), magnetic RAM (MRAM), etc.) and nonvolatile memory elements (e.g., read only memory (ROM), hard drive, tape, compact disk ROM (CD-ROM), etc.). Moreover, the memory system 430 may incorporate electronic, magnetic, optical, and/or other types of storage media. Note that the memory system 430 can have a distributed architecture, where various components are situated remote from one another, but can be accessed by the processor 424.

The software in memory system 430 may include one or more separate programs, each of which comprises executable instructions for implementing logical functions. In the example of FIG. 4, the software in memory system 430 includes a BFS client application 432, a host application 433, a peripheral device manager 434, a PDD 436, a communication port driver 437, and an operating system (OS) 431. The BFS client application 432 is responsible for receiving BFS files that are broadcast over the communications network 130. The host application 433, which provides certain functionality to a user of the STT 120, communicates with the peripheral device 150 with the help of the PDD 436. The host application 433 may provide, for example, among others, video-on-demand, interactive television program guide, or Internet access functionality. The peripheral device manager 434 may, in one implementation, communicate with the BFS client application 432 in order to request a driver for the peripheral device 150. The operating system 431 essentially controls the execution of the other applications, and provides scheduling, input-output control, file and data management, memory management, and/or communication control, among other functionality.

Each of the above applications may be a source program, an executable program (e.g., object code), a script, or any other entity comprising a set of instructions to be executed. When an application is a source program, then it may be translated via a compiler, assembler, interpreter, or the like, which may be included within the memory system 430, so as to operate properly in connection with the OS 431. Furthermore, an application can be written as (a) an object oriented programming language, which has classes of data and methods, or (b) a procedure programming language, which has routines, subroutines, and/or functions.

FIG. 5 is a flow chart depicting a method 500 for downloading a PDD 436 according to one embodiment of the invention. As indicated in step 501, the STT 120 (FIG. 1) receives a request (e.g., from an STT user) for a task to be performed by a peripheral device 150 (FIG. 1). As a non-limiting example, among others, the task may be a print job, and the peripheral device 150 may be a printer. If more than one peripheral device 150 are available for performing a requested task, then a user of the STT 120 may be able to select which peripheral device 150 will be used to perform the requested task. In response to receiving a request for the task, the STT 120 downloads, as indicated in step 502, a PDD 436 that can be used to enable the peripheral device 150 to perform the requested task.

In one implementation, the peripheral device manager 434 may be informed by another application (e.g., the host application 433) that a task is to be performed by the peripheral device 150. In response to such notice, the peripheral device manager 434 may use a map file downloaded from the headend 110 to determine the appropriate driver for the peripheral device 150. Such map file may contain entries that describe the download locations of respective peripheral device drivers. A map file entry may correspond to a driver that is specific to a particular peripheral device model or to a driver that is generic to a certain type of peripheral device. The peripheral device manager 434 may inform the BFS client 432 of the name of the BFS file containing the desired driver and/or of the download location of such file. The BFS client 432 may then extract the desired driver from a BFS carousel that is broadcast from the headend 110, and cause the desired driver to be stored in memory system 430. In an alternative embodiment, a PDD 436 may be downloaded via a unicast transmission or via a non-carousel broadcast from the headend 110 (or other remote location).

FIG. 6 is a flow chart depicting a method 600 for deleting a PDD 436 according to one embodiment of the invention. As indicated in step 601, the STT 120 (FIG. 1) determines that there is no pending task to be performed by a peripheral device 150 (FIG. 1). A counter may be used to keep track of the number of pending tasks to be performed by the peripheral device 150. Such a counter may, for example, be decremented and then examined after each task is performed by the peripheral device 150. When such counter reaches zero, then a determination may be made that there is no pending task to be performed by the peripheral device 150.

In response to determining that there is no pending task to be performed by the peripheral device 150, the STT 120 deletes the PDD 436 from memory system 430 and/or designates the memory resources occupied by the driver as available for storing other content, as indicated in step 602. By deleting the PDD 436 when it is not in use, limited memory resources of the STT 120 may be utilized more efficiently. The steps 601 and/or 602 may be implemented by the STT 120 via, for example, the peripheral device manager 434 and/or other applications or elements of the STT 120.

Figure 7:
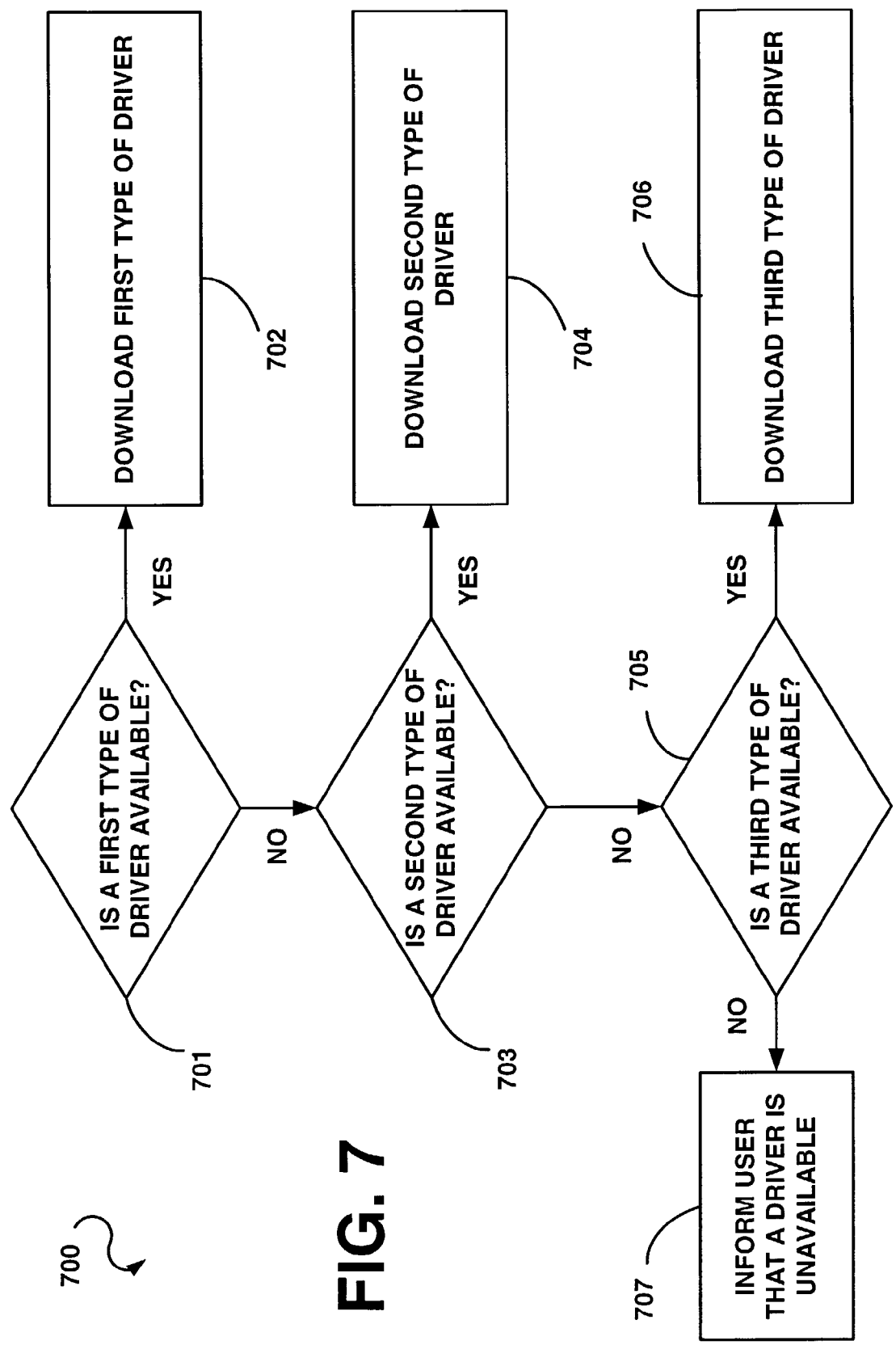
FIG. 7 is a flow chart depicting a method for downloading a PDD according to one embodiment of the invention.

FIG. 7 is a flow chart depicting a method 700 for downloading a PDD 436 according to one embodiment of the invention. Some or all of the steps of method 700 may be initiated and/or implemented by STT 120 (FIG. 1) through the peripheral device manager 434 (FIG. 4). As indicated in step 701, the STT 120 determines whether a first type of driver is available to be downloaded. The first type of driver is preferably a driver that is specifically programmed to help operate peripheral devices having the same make and model as the peripheral device 150. If the first type of driver is available, then the STT 120 downloads the first type of driver, as indicated in step 702.

If the first type of driver is not available to be downloaded, then, as indicated in step 703, the STT 120 determines whether a second type of driver is available to be downloaded. The second type of driver is preferably a driver that is programmed to help operate peripheral devices that are manufactured by the same manufacturer of the peripheral device 150, and that therefore may be capable of enabling the operation of the peripheral device 150. If the second type of driver is available, then the STT 120 downloads the second type of driver, as indicated in step 704.

If the second type of driver is not available to be downloaded, then, as indicated in step 705, the STT 120 determines whether a third type of driver is available to be downloaded. The third type of driver may be a generic driver that is not specifically programmed to help operate the peripheral device 150, but that might, nevertheless, be capable of doing so, at least in part. If the third type of driver is available, then the STT 120 downloads the third type of driver, as indicated in step 706. If, however, the third type of driver is not available, then the STT 120 informs the user of the STT 120 that a driver is unavailable and/or that a requested task to be performed by the peripheral device 150 is incapable of being performed.

FIG. 8 is a flow chart depicting a method 800 for managing a PDD 436 according to one embodiment of the invention. Some or all of the steps of method 800 may be initiated and/or implemented by STT 120 (FIG. 1) through the peripheral device manager 434 (FIG. 4). As indicated in step 801, the STT 120 receives a request (e.g., from an STT user) for a task to be performed by a peripheral device 150 (FIG. 1). In response to receiving a request for the task, the STT 120 determines in step 802 whether a driver for operating the peripheral device 150 currently resides in memory system 430 (FIG. 4). If such driver is currently residing in memory system 430, then the driver is used to enable the peripheral device 150 to perform the requested task, as indicated in step 803. If, however, a driver for operating the peripheral device 150 does not currently reside in memory system 430, then the STT 120 downloads such a driver (e.g., from the headend 110 (FIG. 1) using a download approach mentioned above), as indicated in step 804.

After a driver is downloaded from the headend 110, the driver is used to enable the peripheral device 150 to perform the requested task, as indicated in step 803. The peripheral device 150 then determines whether another task to be performed by the peripheral device 150 is currently pending, as indicated in step 805. If there is no other pending task to be performed by the peripheral device 150, the STT 120 deletes the PDD 436 from memory system 430 and/or designates the memory resources occupied by the driver as available for storing other content, as indicated in step 806. If, however, there is another task pending, then the driver 436 is used to enable the peripheral device 150 to perform such task, as indicated in step 803.

The steps depicted in FIGS. 3 and 5-8 may be implemented using modules, segments, or portions of code which include one or more executable instructions. In an alternative implementation, functions or steps depicted in FIGS. 3 and 5-8 may be executed out of order from that shown or discussed, including substantially concurrently or in reverse order, depending on the functionality involved, as would be understood by those of ordinary skill in the art.

The functionality provided by the methods illustrated in FIGS. 3 and 5-8, can be embodied in any computer-readable medium for use by or in connection with a computer-related system (e.g., an embedded system) or method. In this context of this document, a computer-readable medium is an electronic, magnetic, optical, semiconductor, or other physical device or means that can contain or store a computer program or data for use by or in connection with a computer-related system or method. Furthermore, the functionality provided by the methods illustrated in FIGS. 3 and 5-8 can be implemented through hardware (e.g., an application specific integrated circuit (ASIC) and supporting circuitry), software, or a combination of software and hardware.

It should be emphasized that the above-described embodiments of the invention are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and invention and protected by the following claims. In addition, the scope of the invention includes embodying the functionality of the preferred embodiments of the invention in logic embodied in hardware and/or software-configured mediums.

What is claimed is:

1. A method for managing a peripheral device driver (PDD), comprising:
   receiving a request to perform a task from the peripheral device;
   determining whether a peripheral-device-specific PDD that is configured to enable the peripheral device to perform the requested task is currently stored in a local memory;
   responsive to the determining that the peripheral-device-specific PDD is not currently stored in the local memory, determining whether the peripheral-device-specific PDD is available for download from a remote source, wherein determining whether the peripheral-device-specific PDD is available for download comprises:
      downloading a map file generated by the remote source, wherein the map file comprises a listing of a plurality of PDD download locations corresponding to a plurality of supported peripheral devices, and
      retrieving at least one download location associated with the peripheral device requesting the task to be performed;
   responsive to receiving the request and responsive to determining that the peripheral-device-specific PDD is available, downloading into the local memory the peripheral-device-specific PDD from the at least one download location of the remote source, the peripheral-device-specific PDD being configured to enable the peripheral device to perform the requested task;
   determining whether or not another task is currently pending to be performed by the peripheral device; and
   causing the peripheral-device-specific PDD to be deleted from the local memory, responsive to determining that no other task is currently pending to be performed by the peripheral device.

2. The method of claim 1, wherein the peripheral-device-specific PDD is downloaded via a broadcast object carousel.

3. The method of claim 2, wherein the broadcast object carousel complies with a Digital Storage Media Command and Control (DSM-CC) protocol.

4. The method of claim 1, wherein the remote source is a headend.

5. The method of claim 1, wherein the peripheral device is a printer and the task is a print job.

6. The method of claim 1, wherein the method is implemented by a set-top terminal.

7. The method of claim 1, wherein receiving further comprises receiving the request from an application.

8. The method of claim 1, wherein receiving farther comprises receiving the request from an application, the method farther comprising:
   selecting the peripheral-device-specific PDD to be downloaded from the plurality of PDDs listed in the map file, the plurality of PDDs including at least one of the peripheral-device-specific PDD, a manufacturer-specific PDD, and a generic PDD.

9. The method of claim 8, farther comprising:
   obtaining from the map file an identifier of the selected peripheral-device-specific PDD; and
   extracting the selected peripheral-device-specific PDD from a broadcast carousel that is received from the remote source.

10. A system for managing a peripheral device driver (PDD), comprising:
    a memory; and a processor that is coupled to the memory and that is configured to:
- receive a request for a task to be performed by a peripheral device;
- determine whether a peripheral-device-specific PDD that is configured to enable the peripheral device to perform the requested task is currently stored in the memory;
- responsive to the determining that the peripheral-device-specific PDD is not currently stored in the memory, determine whether the peripheral-device-specific PDD is available for download from a remote source, wherein determining whether the peripheral-device-specific PDD is available for download comprises being operative to:
  - download a map file generated by the remote source, wherein the map file comprises a listing of a plurality of PDD download locations corresponding to a plurality of supported peripheral devices, and
  - retrieve at least one download location associated with the peripheral device requesting the task to be performed;
- responsive to receiving the request and responsive to determining that the peripheral-device-specific PDD is available, download into the memory the peripheral-device-specific PDD from the at least one download location of the remote source via a broadcast object carousel, the peripheral-device-specific PDD being configured to enable the peripheral device to perform the requested task;
  - determine whether or not another task is currently pending to be performed by the peripheral device; and
  - cause the peripheral-device-specific PDD to be deleted from the memory, responsive to determining that no other task is currently pending to be performed by the peripheral device.

11. The system of claim 10, wherein the peripheral-device specific PDD is downloaded via a broadcast object carousel.

12. The system of claim 11, wherein the broadcast object carousel complies with a Digital Storage Media Command and Control (DSM-CC) protocol.

13. The system of claim 10, wherein the remote source is a headend.

14. The system of claim 10, wherein the peripheral device is a printer and the task is a print job.

15. The system of claim 10, wherein the system is a set-top terminal.

16. The system of claim 10, wherein the processor is further configured to:
- responsive to determining that the peripheral-device-specific PDD is not available for download, determine whether or not a manufacturer-specific PDD is available for download from the remote source; and
- responsive to receiving the request and responsive to determining that the manufacturer-specific PDD is available, download into the memory the manufacturer-specific PDD from the remote source.

17. The system of claim 16, wherein the processor is further configured to:
- responsive to determining that the manufacturer-device-specific PDD is not available for download, determine whether or not a generic PDD is available for download from the remote source; and
- responsive to receiving the request and responsive to determining that the generic PDD is available, download into the memory the generic PDD from the remote source.

18. A method for printing, comprising:
- receiving a request for a print job to be performed by a printer;
- determining whether or not a printer driver (PD) that is configured to enable the printer to perform the requested print job is currently stored in a local memory;
- responsive to receiving the request and responsive to determining that the PD is not currently stored in the local memory, downloading a map file generated by a remote source, wherein the map file comprises a listing of a plurality of PD download locations corresponding to a plurality of supported printers,
- retrieving at least one download location associated with the PD requesting the print job to be performed;
- downloading into the local memory the PD from the download location of the remote source via a broadcast object carousel;
- utilizing the PD to enable the printer to perform the requested print job;
- determining whether or not another print job is currently pending to be performed by the printer; and
- responsive to determining that no other print job is currently pending to be performed by the printer, causing the PD to be deleted from the local memory.

19. The method of claim 18, wherein the method is implemented by a set-top terminal.

20. The method of claim 18, wherein the PD is downloaded from a headend.

* * * * *

UNITED STATES PATENT AND TRADEMARK OFFICE
CERTIFICATE OF CORRECTION

PATENT NO.        : 7,617,502 B2                                    Page 1 of 1
APPLICATION NO. : 10/288942
DATED             : November 10, 2009
INVENTOR(S)       : Jeffrey R. Sprague It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1705 days.

Signed and Sealed this

Nineteenth Day of October, 2010

David J. Kappos
*Director of the United States Patent and Trademark Office*